Jan. 19, 1937.　　　A. G. LARSON　　　2,068,336
MAGNETIC BRAKE
Filed Dec. 18, 1935
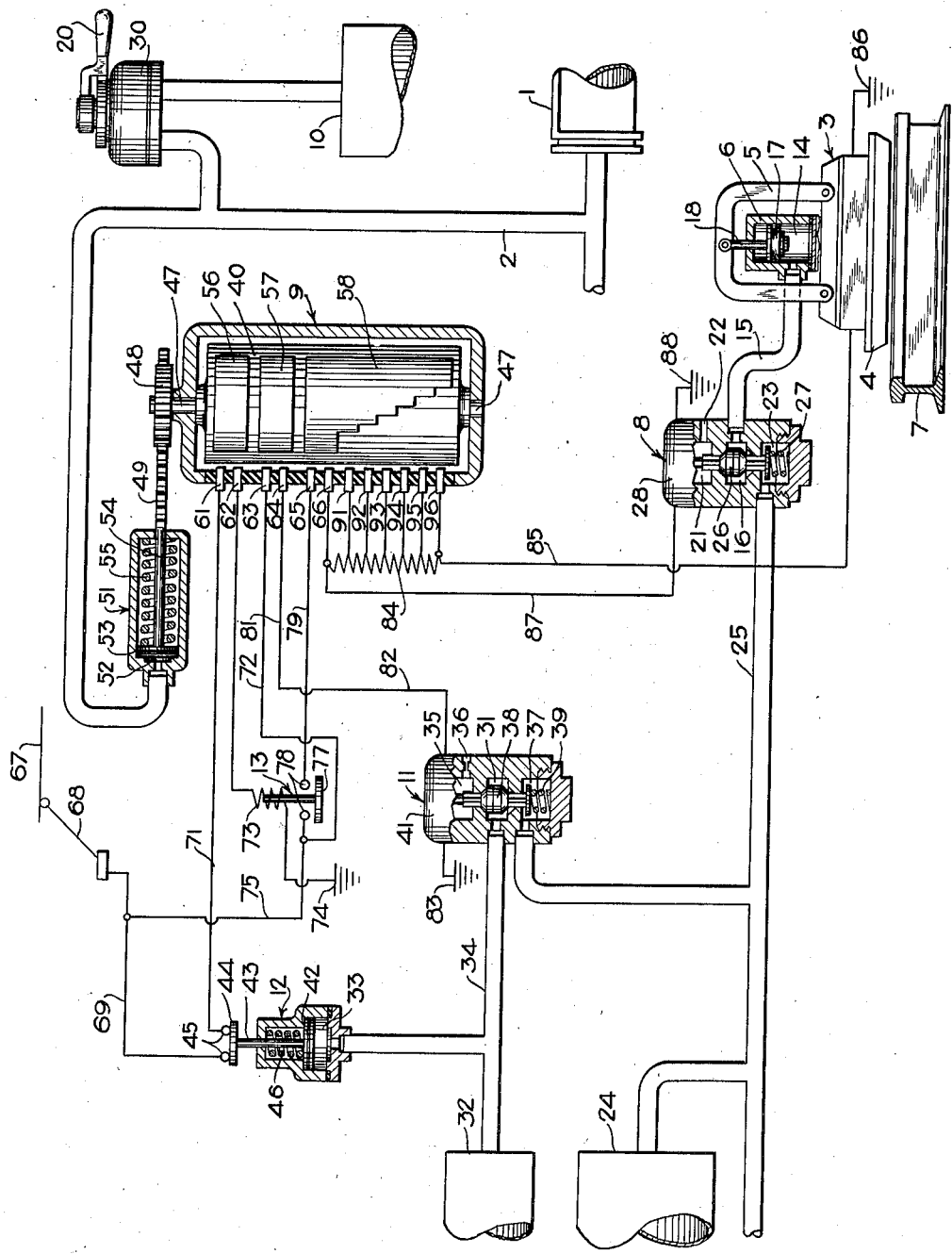
INVENTOR
ARTHUR G. LARSON
BY Wm. M. Cady
ATTORNEY Patented Jan. 19, 1937

2,068,336

UNITED STATES PATENT OFFICE 2,068,336

MAGNETIC BRAKE

Arthur G. Larson, Forest Hills, Pa., assignor to The Westinghouse Air Brake Company, Wilmerding, Pa., a corporation of Pennsylvania Application December 18, 1935, Serial No. 55,056

19 Claims. (Cl. 303—3)

My invention relates to brake equipment employing fluid pressure braking means and magnetic track shoe braking means, and particularly to means for controlling the magnetic track shoe braking means in accordance with the operation of said fluid pressure braking means.

It is an object of my invention to provide a brake equipment employing fluid pressure braking means and electric track shoe braking means together with means for automatically controlling the degree of application of the magnetic track shoe braking means in accordance with the degree of application of the fluid pressure braking means.

It is a further object of my invention to provide a brake equipment of the class described in which means is provided for limiting the application of a track shoe braking means to a predetermined time.

Other objects and advantages of my invention will be apparent from the following description of one preferred embodiment thereof, reference being had to the accompanying drawing.

Referring to the single figure of the accompanying drawing fluid pressure braking means is provided comprising a brake cylinder 1 and a brake cylinder pipe 2 by means of which fluid under pressure is supplied to the brake cylinder from any suitable source such as the main reservoir 10, upon movement of a handle 20 of a brake valve device 30 to a brake applying position in accordance with the well known operation of fluid pressure brake control mechanism. An electric magnetic track shoe braking means 3 is provided comprising a track shoe mounted on a supporting mechanism 5 controlled by the track shoe brake raising and lowering cylinder 6, that is controlled by the track shoe raising and lowering magnet valve device 8, that is, in turn, controlled by an electric controller device 9 in accordance with brake cylinder pressure. The controller device 9 also controls a timing magnet valve device 11 which controls a pressure operated timing switch 12 and an electric contactor 13 for controlling the circuit to the winding of the track shoe 4.

The track shoe raising and lowering cylinder 6 contains a piston chamber 14, that is in constant communication through pipe 15 with a valve chamber 16 of a magnet valve device 8, and which contains a piston 17 having a piston stem 18 connected to the supporting structure 5 for raising and lowering the supporting structure and the track shoe 4 out of and into engagement with the track rail 7.

The magnet valve device 8 comprises a casing providing the aforementioned valve chamber 16, an exhaust chamber 21 that is in constant communication with the atmosphere through an exhaust port 22, and an inlet chamber 23 that is in constant communication with a supply reservoir 24 through a supply reservoir pipe 25. A double beat valve 26 is contained within the valve chamber 16 and is urged upwardly to its upper seat by a spring 27 contained within the inlet chamber 23, and is adapted to be forced downwardly to its lower seat by a magnet 28 in the upper part of the casing of the magnet valve device 8.

The timing magnet valve device 11 comprises a casing providing a valve chamber 31 that is in constant communication with a timing reservoir 32 and with a piston chamber 33 contained within the casing of the pressure operated switch 12, by means of a pipe 34. The casing also provides an exhaust chamber 35 that is in constant communication with the atmosphere through a restricted exhaust port 36, and an inlet chamber 37 that is in constant communication with the supply reservoir 24 through supply reservoir pipe 25. A double beat valve 38 is contained within the valve chamber 31 and is biased to its upper seated position by a spring 39 contained within the inlet chamber 37, and is adapted to be forced to its lower seated position by a magnet 41 in the upper part of the casing of the magnet valve device 11.

A timing switch device 12 comprises a casing providing the aforenamed piston chamber 33 containing a piston 42 having a piston stem 43 that carries a movable switch contact member 44 that is adapted to engage fixed contact members 45. A spring 46 is provided about the stem 43 to force the switch contact member 44 and the piston 42 downwardly when the pressure in the piston chamber 33 is decreased below a predetermined value to effect the separation of a switch contact member 44 from the switch contact members 45.

The electric controller 9 comprises a casing enclosing a controller drum 46 mounted upon a shaft 47 provided at its upper end with a pinion 48 for engaging an operating ratchet 49. An operating cylinder 51 is provided for operating the controller ratchet and drum and comprises a casing providing a piston chamber 52 that is in constant communication with the brake cylinder pipe 2 and which contains a piston 53 having a stem 54 operatively connected to the ratchet 49. A spring 55 is provided about the stem 54 to move the piston 53 toward the left when no pressure is exerted within the piston chamber 52 to thus move the controller device to its release position. Conducting segments 56, 57 and 58 are provided on the controller drum 40 for controlling the several parts of the braking mechanism in a manner to be later described.

The system may be charged from a source of fluid under pressure, not shown, or from the main reservoir 10, through the supply reservoir pipe 25 to charge the supply reservoir 24. Fluid under pressure also flows from the supply reservoir pipe 25 through the inlet chamber 23, valve chamber 16 of the magnet valve device 8, and pipe 18 to the piston chamber 14 of a magnet track shoe raising and lowering cylinder 6, thus forcing the piston 17 upwardly to raise the track shoe 4 from engagement with the track rail 7. Fluid under pressure also flows from the supply reservoir pipe 25 through the inlet chamber 37 and the valve chamber 31 of the timing magnet valve device 11, and through pipe 34 to charge the timing reservoir 32 and the piston chamber 33 of the pressure operated switch 12, thus forcing the piston 42 upwardly to cause the switch contact member 44 to engage contact members 45.

If the operator wishes to apply the brakes he moves the handle 20 of the brake valve device 30 to effect the supply of fluid under pressure from the main reservoir 10 to the brake cylinder 1 through brake cylinder pipe 2. Upon the increase in brake cylinder pressure a corresponding increase in pressure is effected in the piston chamber 52 of the controller operating cylinder 51 causing the piston 53 to be moved against the bias of the spring 55, and to correspondingly move the ratchet 49 and drum 40, an amount depending upon the pressure of the fluid supplied to the brake cylinder 1.

Upon a relatively small movement of the controller drum 40 the segment 56 is brought into engagement with the conducting members 61 and 62, the segment 57 bridges the contact members 63 and 64, and the segment 58 bridges the contact members 65 and 66. The conducting segment 56 effects the energization of the contactor 13 through a circuit extending from the over-head trolley conductor 67 through trolley 68, conductor 69, the switch contact members 44 and 45 of the pressure operated switch 12, conductor 71, contact member 61, segment 56, contact member 62, conductor 72, the winding 73 of the contactor 13, to ground at 74, thus energizing the contactor 13 and causing it to move the contact member 77 into engagement with the contact member 78 to bring trolley voltage to the controller contact member 65 through a circuit extending from the over-head line conductor 67, through trolley 68, conductor 75, switch contact members 77 and 78 and conductor 79 to the contact member 65.

The conducting segment 57 controls the energization of the winding of the magnet valve device 11 through a circuit extending from the overhead trolley conductor 67 through trolley 68, conductor 75, conductor 81, contact member 63, segment 57, contact member 64, conductor 82, the winding of the magnet 41 to ground at 83, thus forcing the double beat valve 38 downwardly against the bias of the spring 39 to its lower seat, to close communication between the supply reservoir pipe 24 and the timing reservoir 32 and piston chamber 33 of the timing switch 12, and effect communication from the timing reservoir 32 and the piston chamber 33 to the atmosphere through the valve chamber 31, the release chamber 35, and the restricted exhaust port 36 to permit the piston 42 of the timing switch 12 and the contact member 44 thereof to be forced downwardly by the spring 46, thus interrupting the circuit through the switch contact members 44 and 45 after a predetermined time.

The conducting segment 58 upon engagement with the contact members 65 and 66 completes the circuit a portion of which is above traced from the overhead trolley through the line contactor 13 to the contact member 65. This circuit continues through the resistor 84, conductor 85, the winding of a track shoe 4 to ground at 86, thus energizing the magnetic track shoe. A circuit is also completed through the contact members 65 and 66, conductor 87 and the winding of the magnet 28 of the track shoe raising and lowering magnet valve device 8, to ground at 88, thus energizing the winding of the magnet 28 and causing it to force the double beat valve 26 downwardly against its lower seat to close communication from the supply reservoir pipe 25 to the piston chamber 14 of the raising and lowering cylinder 6, and to effect communication from the piston chamber 14 to the atmosphere through pipe 15, valve chamber 16, the exhaust chamber 21, and exhaust port 22. Upon the release of fluid under pressure from the piston chamber 14 the piston 17 together with the supporting structure 5 and the track shoe 4 moves by gravity into engagement with the track rail 7.

After movement of the controller drum 40 as above described to effect the initial application of the track shoe brake a further movement of the drum 40, and of the conducting segment 58, toward the left effects engagement of the segment 58 with one or more of the contact members 91 to 96 inclusive depending upon the degree of movement thereof, to shunt from the circuit of the winding of the track shoe magnet corresponding sections of the resistor 84, thus increasing the degree of energization of the track shoe. The amount of movement of the drum 46 and of the segment 58 is determined by the amount of pressure in the brake cylinder 1 and brake cylinder pipe 2. It will be seen, therefore, that the degree of energization of the track shoe brakes is dependent upon the brake cylinder pressure.

At a predetermined time after the magnet valve device 11 is energized, the release of fluid under pressure from the timing reservoir 32 and from the piston chamber 33 of the timing switch 12, through the restricted exhaust port 36 of the magnet valve device 11 will have decreased the pressure in the piston chamber 33 sufficiently that the spring 46 will force the piston 42 and the contact member 44 downwardly to interrupt the circuit above traced through the switch contact members 44 and 45 and the winding 73 of the contactor 13, thus causing the contactor to drop to its lower or circuit interrupting position to interrupt the energization of the track shoe 4, and also of the track shoe raising and lowering magnet valve device 8, thus releasing the track shoe magnet braking means and causing the double beat valve 26 to be forced upwardly to its upper seat by the spring 27 to permit the further supply of fluid under pressure from the supply reservoir 24 to the piston chamber 14 to raise the track shoe 4 from engagement with the track rail 7.

Should the operator wish to release the brake prior to the opening of its timing switch 12 he will operate the handle 20 of the brake valve device 30 to release fluid under pressure from the brake cylinder 1 and thus also from the piston chamber 52 of the controller operating cylinder 51 and permit the piston 53 to be moved to the left by the force of the spring 55, to effect movement of the drum 40 and of the conducting segments 56, 57 and 58 to their release positions, to interrupt the circuits through the contact members 61 and 62, 63 and 64, and 65 and 66, respectively, thus bringing the several parts of the mechanism to their release or illustrated positions.

Many modifications of the circuits and apparatus illustrated may be made without departing from the spirit of my invention and I do not wish to be limited otherwise than by the scope of the appended claims.

Having now described my invention, what I claim as new and desire to secure by Letters Patent, is:

1. In a brake equipment for vehicles, in combination, a brake cylinder, means for supplying fluid under pressure to said brake cylinder to effect an application of the brakes, a magnetic track shoe braking means, means including a pressure operated switch and an electric controller responsive to the supply of fluid under pressure to said brake cylinder for controlling the application of said magnetic track shoe braking means and for controlling the degree of application thereof in accordance with brake cylinder pressure, and electrically controlled means for gradually venting fluid under pressure from said pressure operated switch device upon movement of said controller to a brake applying position to effect the release of said magnetic track shoe braking means at a predetermined time after application thereof.

2. In a brake equipment for vehicles, in combination, a brake cylinder, means for supplying fluid under pressure to said brake cylinder to effect an application of the brakes, a magnetic track shoe braking means, means including an electric controller responsive to the supply of fluid under pressure to said brake cylinder for controlling the application of said magnetic track shoe braking means, and electrically controlled timing means energized upon movement of said controller to a brake applying position for effecting the release of said magnetic track shoe braking means at a predetermined time after application thereof.

3. In a brake equipment for vehicles, fluid pressure braking means, magnetic track shoe braking means, manually operable means for controlling the supply of fluid under pressure to effect fluid pressure application of the brakes, means comprising an electric controller responsive to the supply of fluid under pressure to effect a fluid pressure application of the brakes for completing the circuit for effecting application of the magnetic track shoe braking means, and means operative independently of the position of said controller for effecting the release of said magnetic track shoe braking means at a predetermined time after application thereof.

4. In a brake equipment for vehicles, fluid pressure braking means, magnetic track shoe braking means, manually operable means for controlling the supply of fluid under pressure to effect fluid pressure application of the brakes, means responsive to the supply of fluid under pressure to effect a fluid pressure application of the brakes for completing a circuit for effecting application of the magnetic track shoe braking means and for controlling the degree of application thereof in accordance with the degree of application of the fluid pressure braking means, means for interrupting said circuit comprising a pressure operated switch device normally supplied with fluid under pressure and urged thereby to a circuit closing position, and means operative upon fluid pressure application of the brakes for venting fluid under pressure from said pressure operated switch to effect operation of said switch device to a circuit interrupting position after a predetermined time.

5. In a brake equipment for vehicles, fluid pressure braking means, magnetic track shoe braking means, manually operable means for controlling the supply of fluid under pressure to effect fluid pressure application of the brakes, a normally closed pressure operated switch device and means responsive to the supply of fluid under pressure to effect a fluid pressure application of the brakes for completing a circuit for effecting application of the magnetic track shoe braking means and for controlling the degree of application thereof in accordance with the degree of application of the fluid pressure braking means, and timing means for effecting the operation of said pressure operated switch device to a circuit interrupting position to cause the release of said magnetic track shoe braking means at a predetermined time after application thereof.

6. In a brake equipment for vehicles, in combination, a brake cylinder, magnetic track shoe braking means, manually operable means for controlling the supply of fluid under pressure to the brake cylinder to effect a fluid pressure application of the brakes, means for controlling the application and release of said magnetic track shoe braking means comprising an electrically controlled means for lowering the magnetic track shoe into engagement with the track rail, electrically controlled means for energizing said track shoe and means responsive to brake cylinder pressure for controlling the energization of said electrically controlled means to effect an application of said magnetic track shoe braking means upon the supply of fluid under pressure to said brake cylinder, and timing means for effecting the release of said magnetic track shoe braking means at a predetermined time after application thereof.

7. In a brake equipment for vehicles, in combination, a brake cylinder, magnetic track shoe braking means, manually operable means for controlling the supply of fluid under pressure to the brake cylinders to effect a fluid pressure application of the brakes, and means for controlling the application and release of said magnetic track shoe braking means comprising an electrically controlled means for lowering the track shoe into engagement with the track rail, electrically controlled means for energizing said track shoe and means responsive to brake cylinder pressure for controlling the energization of said electrically controlled means to effect an application of said magnetic track shoe braking means upon the supply of fluid under pressure to said brake cylinders and for controlling the degree of application thereof in accordance with brake cylinder pressure.

8. In a brake equipment for vehicles, in combination, a brake cylinder, magnetic track shoe braking means, manually operable means for controlling the supply of fluid under pressure to the brake cylinder to effect a fluid pressure application of the brakes, means for controlling the application and release of said magnetic track shoe braking means comprising electrically controlled means for lowering the track shoe into engagement with the track rail and means responsive to brake cylinder pressure for controlling the energization of said electrically controlled means to effect an application of said magnetic track shoe braking means upon the supply of fluid under pressure to said brake cylinder and for controlling the degree of application thereof in accordance with brake cylinder pressure, and timing means for effecting the release of said magnetic track shoe braking means at a predetermined time after application thereof.

9. In a brake equipment for vehicles, in combination, a brake cylinder, magnetic track shoe braking means, manually operable means for controlling the supply of fluid under pressure to the brake cylinder to effect a fluid pressure application of the brakes, means for controlling the application and release of said magnetic track shoe braking means comprising electrically controlled means for lowering the track shoe into engagement with the track rail and electrically controlled means for energizing the track shoe, timing means comprising a timing reservoir and a fluid pressure operated switch for interrupting the energization of said magnetic track shoe braking means at a predetermined time after application thereof.

10. In a brake equipment for vehicles, in combination, a brake cylinder, magnetic track shoe braking means, manually operable means for controlling the supply of fluid under pressure to the brake cylinder to effect a fluid pressure application of the brakes, and means for controlling the application and release of said magnetic track shoe brakes comprising electrically controlled means for lowering the track shoe into engagement with the track rail and electrically controlled means for energizing the track shoe and an electric controller responsive to brake cylinder pressure for controlling both of said electrically controlled means to effect an application of said magnetic track shoe braking means upon a predetermined brake cylinder pressure and for controlling the degree of application thereof in accordance with brake cylinder pressure.

11. In a brake equipment for vehicles, in combination, a brake cylinder, magnetic track shoe braking means, manually operable means for controlling the supply of fluid under pressure to the brake cylinder to effect a fluid pressure application of the brakes, means for controlling the application and release of said magnetic track shoe braking means comprising electrically controlled means for lowering the track shoe into engagement with the track rails and electrically controlled means for energizing the track shoe, an electric controller responsive to brake cylinder pressure for controlling said electrically controlled means to effect an application of said magnetic track shoe braking means upon a predetermined brake cylinder pressure and for controlling the degree of application thereof in accordance with brake cylinder pressure, and timing means comprising a timing reservoir and a fluid pressure operated switch for interrupting the energization of said magnetic track shoe braking means at a predetermined time after application thereof.

12. In a brake equipment for vehicles, in combination, a brake cylinder, magnetic track shoe braking means, manually operable means for controlling the supply of fluid under pressure to the brake cylinder to effect a fluid pressure application of the brakes, means for controlling the application and release of said magnetic track shoe braking means comprising a magnet valve device for controlling the lowering of said magnetic track shoe into engagement with the track rail, an electric contactor for controlling the energization of said track shoe, and means responsive to brake cylinder pressure for controlling the energization of said magnet valve device and of said contactor to effect an application of said magnetic track shoe braking means, and means responsive to brake cylinder pressure for controlling the degree of application of said magnetic track shoe braking means.

13. In a brake equipment for vehicles, in combination, a brake cylinder, magnet track shoe braking means, manually operable means for controlling the supply of fluid under pressure to the brake cylinder to effect a fluid pressure application of the brakes, means for controlling the application and release of said magnetic track shoe braking means comprising electrically controlled means for lowering the track shoe into engagement with the track rail and electrically controlled means energizing the track shoe, an electric controller responsive to brake cylinder pressure for controlling said electrically controlled means to effect application of said magnetic track shoe braking means upon a predetermined brake cylinder pressure and for controlling the degree of application thereof in accordance with brake cylinder pressure, and timing means for interrupting the energization of said magnetic track shoe braking means at a predetermined time after application thereof comprising a timing reservoir, a normally closed fluid pressure operated switch connected to said timing reservoir, and a magnet valve device governed by the controller for controlling the release of fluid under pressure from said timing reservoir and said pressure operated switch for effecting the operation of said pressure operated switch to its circuit interrupting position after a predetermined time.

14. In a brake equipment for vehicles, in combination, a brake cylinder, magnetic track shoe braking means, means for supplying fluid under pressure to said brake cylinder to effect an application of the brakes, means responsive to the supply of fluid under pressure to the brake cylinder for effecting the application of said magnet track shoe braking means, and timing means for interrupting the energization of said magnet track shoe braking means at a predetermined time after application thereof comprising a pressure operated switch and a timing reservoir for supplying fluid under pressure to a chamber of said pressure operated switch, a magnet valve device through which said pressure operated switch and said timing reservoir are charged, and means for controlling the operation of said magnet valve device upon application of the magnetic track shoe braking means to effect a gradual release of fluid under pressure from the timing reservoir and the chamber of said pressure operated switch.

15. In a brake equipment for vehicles, in combination, a brake cylinder, magnetic track shoe braking means, means for supplying fluid under pressure to said brake cylinder to effect an application of the brakes, means responsive to the supply of fluid under pressure to the brake cylinder for effecting the application of said magnetic track shoe braking means including a contactor for closing an electric circuit through which the winding of said track shoe is energized, a control circuit for said contactor, a pressure operated switch in said control circuit having a chamber, a timing reservoir in communication with said chamber, means normally operated for effecting the supply of fluid under pressure to said timing reservoir and said switch chamber for mantaining said switch in its circuit closing position, and operable upon the application of said magnetic track shoe braking means for effecting the gradual release of fluid under pressure from said timing reservoir and said switch chamber to effect the operation of said switch to a circuit interrupting position after a predetermined time.

16. In a vehicle brake system, in combination, a brake cylinder, a magnetic track brake device, a first fluid pressure operated switch device having contacts adapted to be closed in response to pressure of fluid supplied to said brake cylinder, a normally charged reservoir, a magnet valve device responsive to closing of said contacts for connecting said reservoir to a communication having a restricted passage leading to the atmosphere, a second fluid pressure operated switch device having contacts adapted to be closed when said reservoir is connected to said communication and adapted to remain closed until the pressure of said fluid in said communication will have diminished below a predetermined value due to leakage of fluid through said restricted passage, and means operative while said last mentioned contacts are closed for effecting an application of said magnetic track brake device.

17. In a vehicle brake system, in combination, a brake cylinder, a magnetic track brake device, a normally open circuit, means responsive to closing of said circuit for effecting an application of said track brake device, a first set of normally open contacts in said circuit, a second set of normally open contacts also in said circuit, means responsive to brake cylinder pressure for effecting closing of said second set of contacts, and means operative upon closing of said second set of contacts for effecting closing of said first set of contacts for a predetermined interval of time.

18. In a vehicle brake system, in combination, a track brake device, fluid pressure operated means adapted when fluid under pressure is supplied thereto to maintain said track brake device suspended above a track rail, electroresponsive means operable when deenergized to effect a supply of fluid under pressure to said fluid pressure operated means and when energized to release fluid under pressure therefrom, timing means operable to effect energization of said electroresponsive means for a predetermined interval of time, and fluid pressure controlled means for controlling operation of said timing means.

19. In a vehicle brake system, in combination, a magnetic track brake means, fluid pressure operated means operable when fluid under pressure is supplied thereto to maintain said track brake means suspended above a track rail, a magnet valve device operable when deenergized to effect a supply of fluid under pressure to said fluid pressure operated means and when energized to cut off said supply and to release fluid under pressure therefrom to the atmosphere, a normally open circuit, means responsive to closing of said circuit for effecting energization of said magnet valve device, and fluid pressure controlled means for effecting closing of said circuit for a predetermined interval of time.

ARTHUR G. LARSON.